United States Patent
Nadler

(10) Patent No.: US 7,384,223 B2
(45) Date of Patent: Jun. 10, 2008

(54) ANCHORING DRILL BIT, SYSTEM AND METHOD OF ANCHORING

(76) Inventor: Donald S. Nadler, 800 NE. Jamestown Ct., Blue Springs, MO (US) 64014

(*) Notice: Subject to any disclaimer, the term of this patent is extended or adjusted under 35 U.S.C. 154(b) by 0 days.

(21) Appl. No.: 10/988,998

(22) Filed: Nov. 12, 2004

(65) Prior Publication Data

US 2005/0098358 A1 May 12, 2005

Related U.S. Application Data

(60) Provisional application No. 60/519,223, filed on Nov. 12, 2003.

(51) Int. Cl.
B23B 51/08 (2006.01)
B23B 51/10 (2006.01)
B23B 51/02 (2006.01)

(52) U.S. Cl. .................. 408/224; 408/202; 52/295; 52/293.3; 175/385; 175/391

(58) Field of Classification Search ............... 408/224, 408/225, 202, 241 S; 175/385, 391, 394; 173/1; 52/295, 293.3
See application file for complete search history.

(56) References Cited

U.S. PATENT DOCUMENTS

| | | | |
|---|---|---|---|
| 679,693 A | | 7/1901 | Burkhart |
| 835,125 A | | 11/1906 | Webb |
| 1,141,568 A | * | 6/1915 | Lindsay ..................... 175/118 |
| 1,234,487 A | | 7/1917 | Raeger |
| 1,370,031 A | * | 3/1921 | Mangnall ..................... 175/19 |
| 1,479,325 A | * | 1/1924 | Schubnel .................... 408/202 |
| 1,580,569 A | | 4/1926 | Pleister et al. |
| 1,747,117 A | * | 2/1930 | Klein ........................ 76/108.6 |
| 1,993,365 A | * | 3/1935 | Englebright et al. .......... 175/62 |
| 2,532,783 A | * | 12/1950 | Phipps ...................... 175/391 |
| 2,543,206 A | * | 2/1951 | Smith ........................ 408/224 |
| 2,732,869 A | * | 1/1956 | Stearns ...................... 408/224 |
| 2,832,386 A | | 4/1958 | Van Dalen |
| 2,842,015 A | * | 7/1958 | Miller ........................ 408/224 |
| 2,897,695 A | | 2/1959 | Winslow |
| 3,712,753 A | * | 1/1973 | Manzi ........................ 408/224 |
| 3,838,937 A | | 10/1974 | Hawley |
| 3,960,223 A | * | 6/1976 | Kleine ........................ 175/385 |
| 4,039,266 A | * | 8/1977 | O'Connell ................... 408/202 |
| 4,050,344 A | | 9/1977 | Dorgnon |

(Continued)

FOREIGN PATENT DOCUMENTS

DE 3602427 A1 * 7/1987

(Continued)

Primary Examiner—Monica Carter
Assistant Examiner—Michael W. Talbot
(74) Attorney, Agent, or Firm—Sonnenschein Nath & Rosenthal LLP; Bryan P. Stanley

(57) ABSTRACT

A system, apparatuses and methods for anchoring are provided. The system includes two-stage drill bit and a method of anchoring into a two-stage hole drilled by the drill bit. The apparatus of the instant invention includes a two-stage drill bit for drilling a pilot hole for a common nail into a material such as concrete, stone, masonry or cementuous or other materials. The method of the instant invention includes the steps of drilling a first hole within a material to which an object is to be anchored, drilling a second hole concentric with the first hole, and placing an anchor within the holes.

16 Claims, 7 Drawing Sheets

U.S. PATENT DOCUMENTS

| | | | |
|---|---|---|---|
| 4,287,656 A | 9/1981 | Gassman et al. | |
| 4,289,426 A | 9/1981 | Chaiko | |
| 4,454,701 A | 6/1984 | Walter | |
| 4,543,763 A * | 10/1985 | Ernst et al. | 52/698 |
| 4,648,767 A | 3/1987 | Fischer | |
| 4,696,423 A | 9/1987 | Ryan | |
| 4,760,495 A | 7/1988 | Till | |
| 4,795,290 A * | 1/1989 | Lindberg | 408/224 |
| 4,828,445 A | 5/1989 | Giannuzzi | |
| 4,932,819 A | 6/1990 | Almeras | |
| 5,031,709 A * | 7/1991 | Fischer | 175/325.5 |
| 5,078,552 A * | 1/1992 | Albel | 408/1 R |
| 5,092,717 A * | 3/1992 | Fischer | 408/59 |
| 5,114,276 A | 5/1992 | Dupin | |
| 5,114,278 A | 5/1992 | Locotos et al. | |
| 5,288,184 A * | 2/1994 | Heule | 408/224 |
| 5,315,800 A * | 5/1994 | Weber et al. | 52/309.1 |
| 5,326,196 A | 7/1994 | Noll | |
| 5,393,179 A | 2/1995 | Bane | |
| 5,482,410 A * | 1/1996 | Chambers | 408/1 R |
| 5,546,723 A * | 8/1996 | Jones | 52/698 |
| 5,562,376 A | 10/1996 | Fischer | |
| 5,609,446 A * | 3/1997 | Link et al. | 408/224 |
| 5,795,110 A * | 8/1998 | Wirth et al. | 408/110 |
| 5,915,893 A | 6/1999 | Miyanaga | |
| 6,030,155 A | 2/2000 | Scheer et al. | |
| 6,105,332 A * | 8/2000 | Boyadjian | 52/698 |
| 6,162,226 A * | 12/2000 | DeCarlo et al. | 606/80 |
| 6,367,205 B2 * | 4/2002 | Cornett, Sr. | 52/23 |
| 6,367,224 B1 * | 4/2002 | Leek | 52/704 |
| 6,553,640 B1 | 4/2003 | Estes et al. | |
| 6,595,729 B2 * | 7/2003 | Karlsson | 408/118 |
| 6,739,872 B1 * | 5/2004 | Turri | 433/75 |
| 7,097,398 B2 * | 8/2006 | Hernandez, Jr. | 408/224 |
| 7,179,024 B2 * | 2/2007 | Greenhalgh | 408/224 |
| 2002/0011356 A1 | 1/2002 | Hill, III et al. | |
| 2003/0026667 A1 | 2/2003 | Schmid | |
| 2003/0133765 A1 * | 7/2003 | Capriotti | 408/224 |
| 2004/0057804 A1 * | 3/2004 | Jager et al. | 408/224 |
| 2005/0061552 A1 * | 3/2005 | Moore | 175/385 |

FOREIGN PATENT DOCUMENTS

| | | | |
|---|---|---|---|
| DE | 20309656 U1 * | 11/2003 | |
| EP | 248775 A1 * | 12/1987 | |
| EP | 519233 A1 * | 12/1992 | |
| GB | 2123322 A * | 2/1984 | |
| GB | 2195564 A * | 4/1988 | |
| GB | 2271948 A * | 5/1994 | |
| JP | 03294107 A * | 12/1991 | |
| JP | 09029523 A * | 2/1997 | |
| JP | 10034419 A * | 2/1998 | |
| JP | 10196625 A * | 7/1998 | |
| JP | 11058115 A * | 3/1999 | |
| JP | 2003211437 A * | 7/2003 | |
| JP | 2005138258 A * | 6/2005 | |
| WO | WO 200009284 A1 * | 2/2000 | |

* cited by examiner

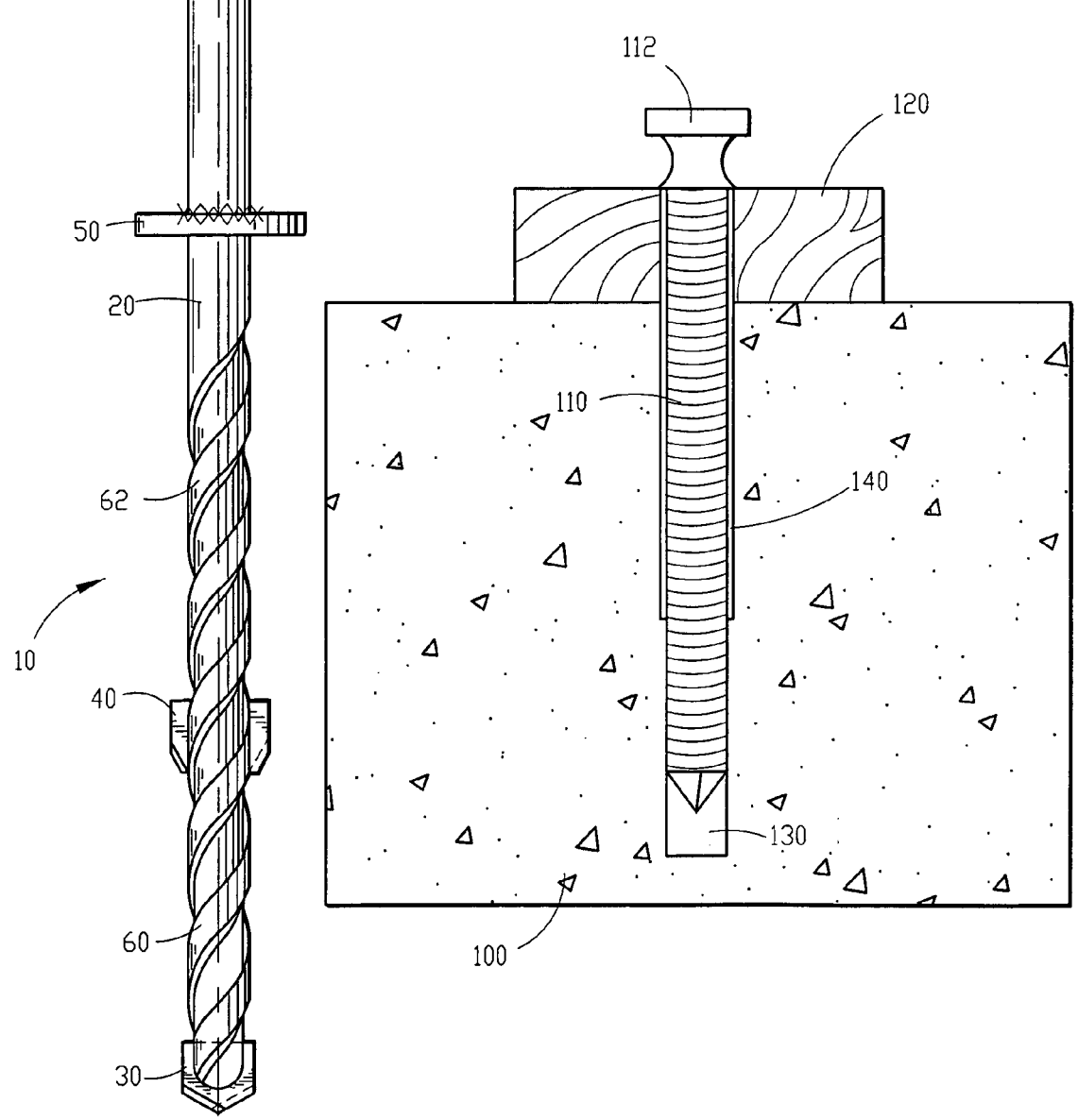

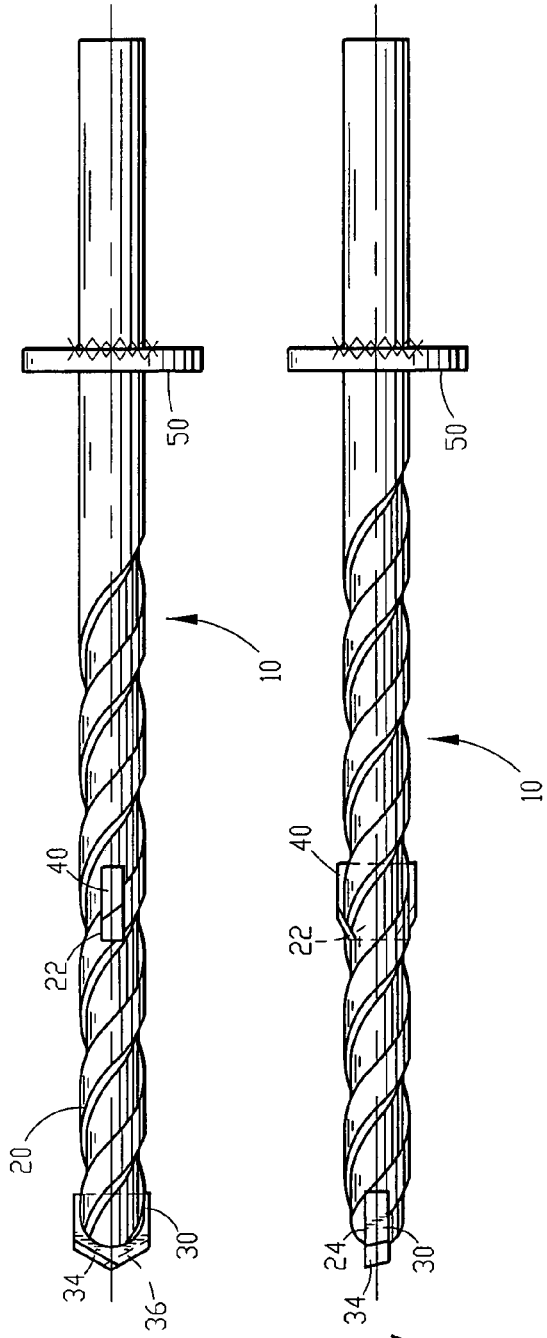
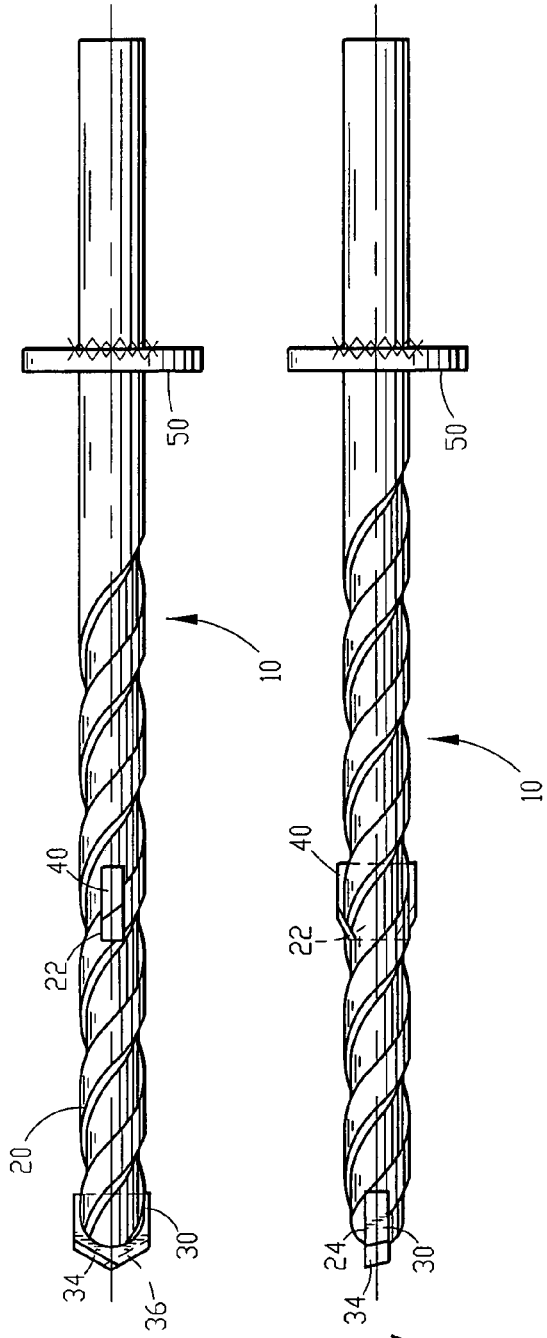
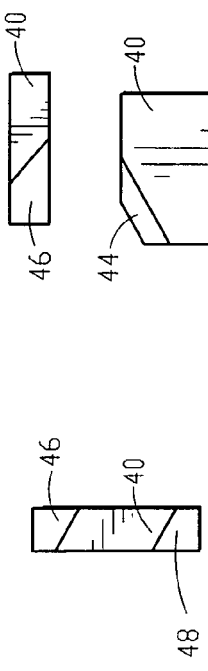
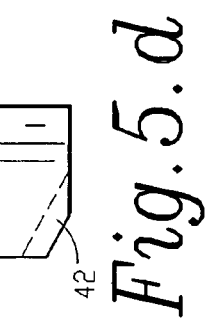
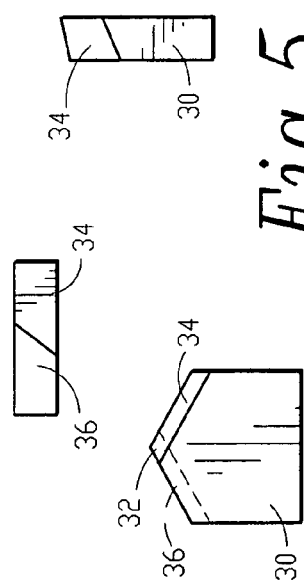

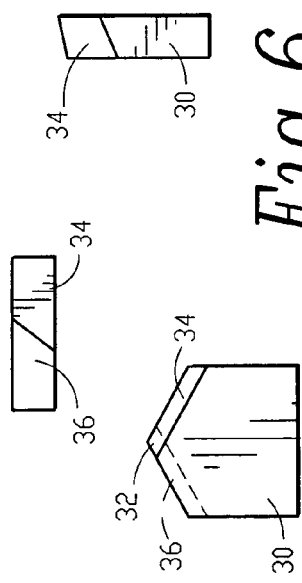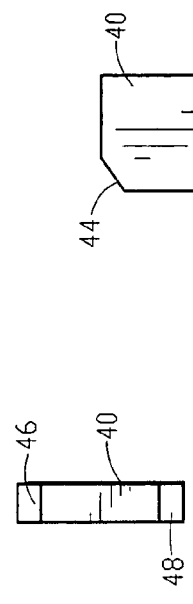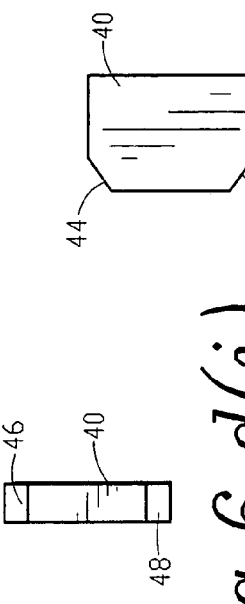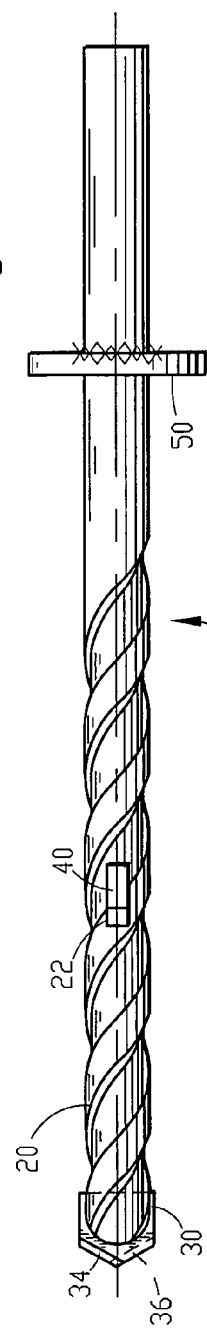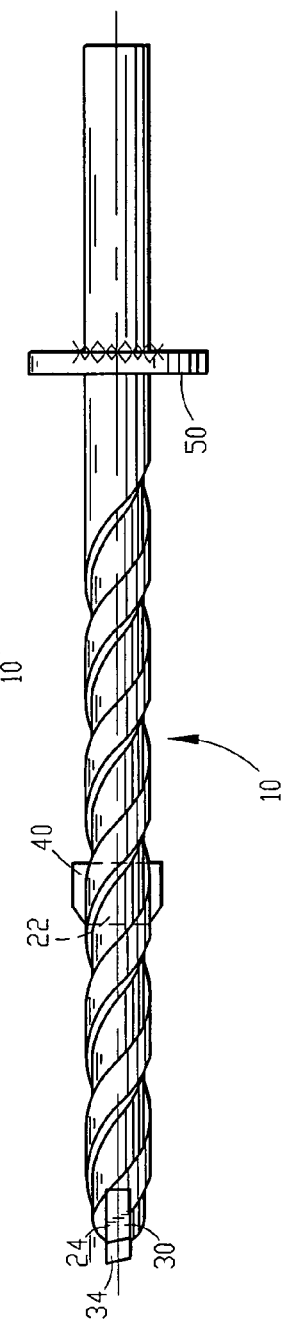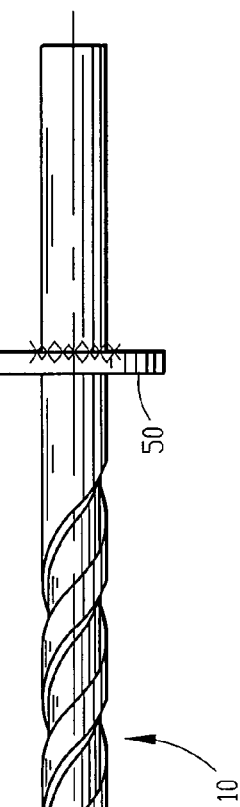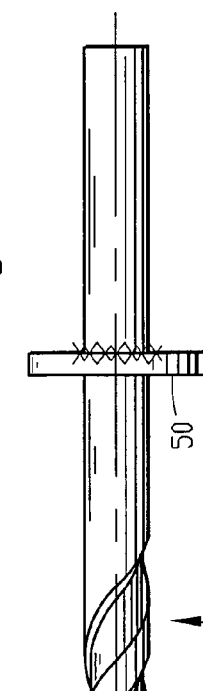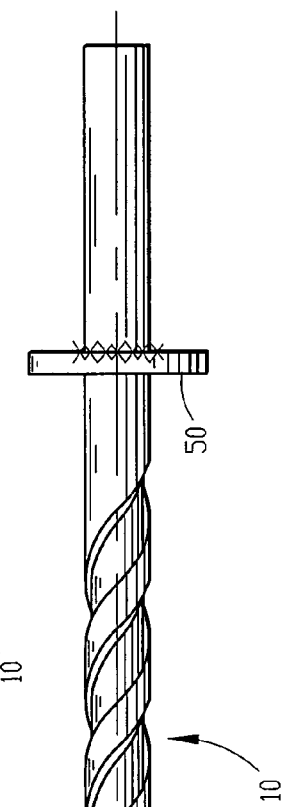

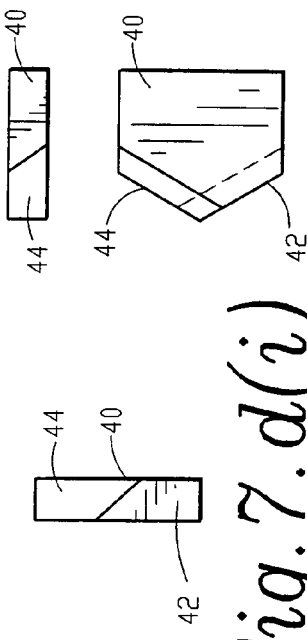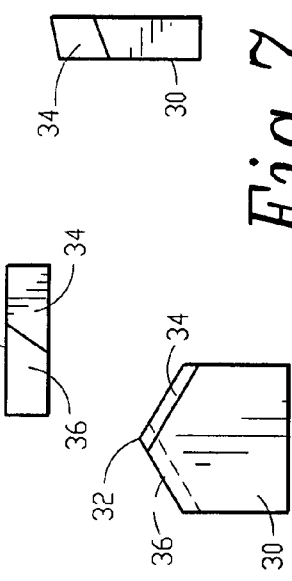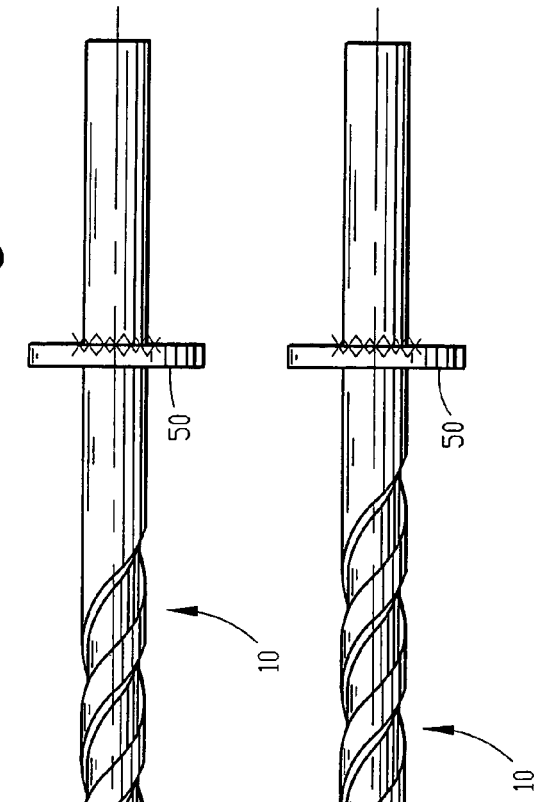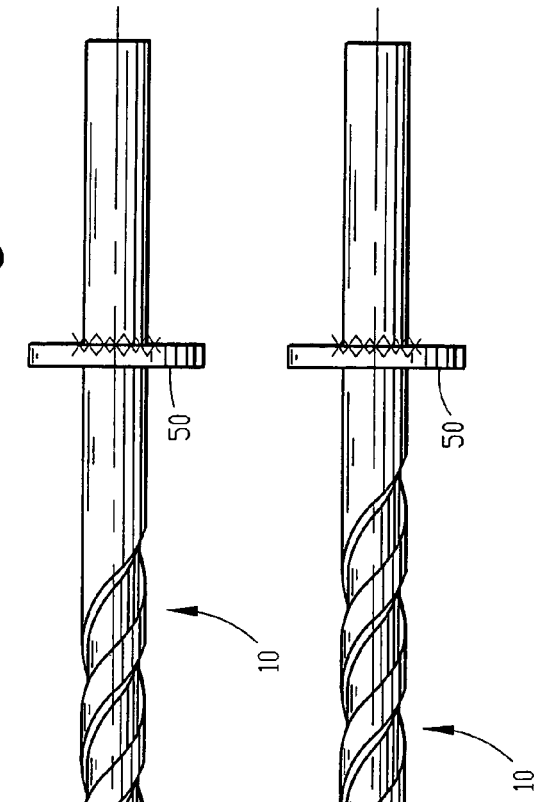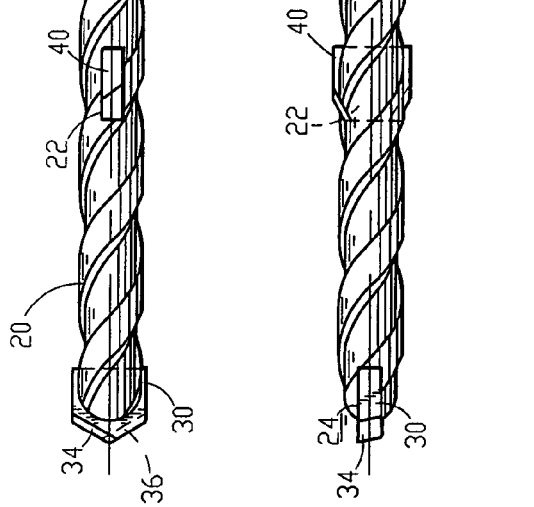

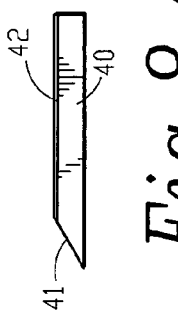
Fig.8.c
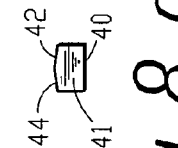
Fig.8.c(i)
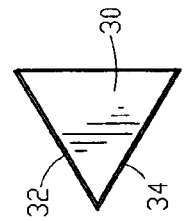
Fig.8.b
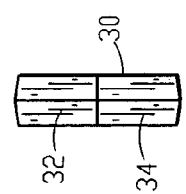
Fig.8.b(i)
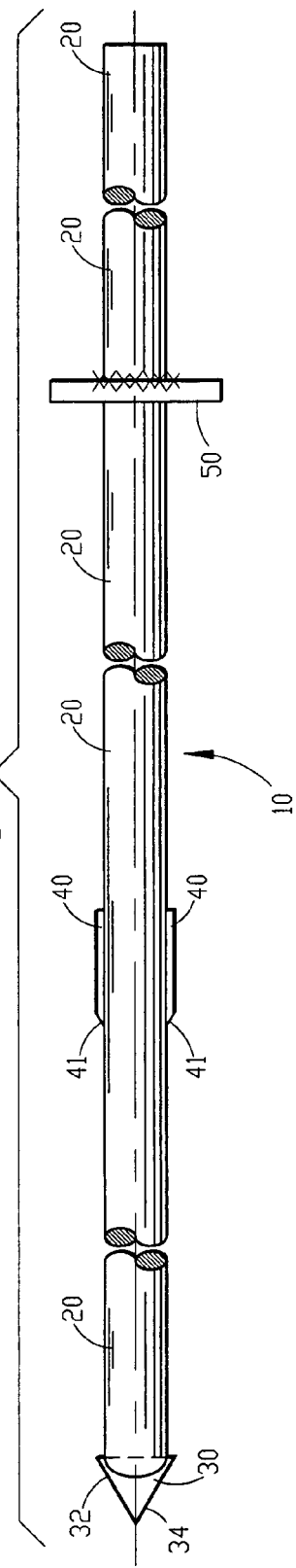
Fig.8.a

ANCHORING DRILL BIT, SYSTEM AND METHOD OF ANCHORING

This application claims priority pursuant to 35 U.S.C. 119(e) to co-pending U.S. Provisional Patent Application Ser. No. 60/519,223, filed Nov. 12, 2003, the entire disclosure of which is incorporated herein by reference.

FIELD OF THE INVENTION

The present invention relates generally to systems, apparatuses and methods for anchoring. More particularly, the present invention is concerned with a two-stage drill bit and a method for anchoring into brittle materials such as concrete, stone, masonry and cementuous materials using a common nail.

BACKGROUND OF THE INVENTION

In construction applications it is often necessary or desirable to anchor into an existing concrete structure. In many construction applications the anchor is intended to be permanent to tie in a newer structure with an existing concrete structure. In such permanent anchoring applications, removal of the anchors is generally not a concern. Thus, the removal of such permanent anchors from the concrete will undoubtedly result in damage to the surface of the concrete.

A number of construction applications currently exist in which it is desirable to provide an anchor into an existing concrete structure that is removable. An example of such an application is present in the commercial construction business in which concrete tilt-wall construction is often employed. In a tilt-wall construction, forms are usually anchored into an existing concrete floor in the shape of the wall. A release agent is applied to the floor and the forms and concrete mix is poured into the forms. When the concrete has hardened, the forms are removed and the wall is lifted from the floor and positioned upright using a crane.

A number of "removable" anchoring systems currently exist for use with concrete. The most common of such systems include either a nail or screw, both of which require pre-drilling of a pilot hole. When a standard nail, such as an 8 common, 8 duplex, 16 common, 16 duplex or the like, is utilized, the pilot hole is usually drilled to be a diameter slightly smaller than the diameter of the nail so as to provide a tight frictional fit between the nail and the concrete when the nail is driven into the hole. A common problem with such applications is that the surface of the concrete is usually damaged as the nail is removed from the concrete.

The most common type of damage to the surface of the concrete is known as spawling, which is caused when the surface of the concrete surrounding the pilot hole is pulled upward by friction with the nail as the nail is pulled upward and breaks away leaving an indentation or pit in the surface of the concrete. When the diameter of the pilot hole is slightly smaller than the diameter of the nail, spawling usually occurs around the entire circumference of the pilot hole. Spawling in a concrete surface is undesirable as it creates an unattractive surface and patching a spawled surface is difficult as the patch will usually flake off.

In an attempt to reduce or eliminate spawling, many contractors will drill a pilot hole having a diameter slightly larger than the diameter of the nail that is being utilized. Because the diameter of the hole is larger than the nail diameter, it is then necessary to insert a softer (than the nail and the concrete) material, such as lawn trimmer cord or a wire, into the hole to provide the frictional fit between the nail and the concrete. Insertion of the softer material is extremely time consuming and requires that the contractor have an ample supply of the material on hand. Furthermore, spawling often still occurs when the nail is removed, as the softer material is usually located on one side of the nail and the opposite side is pressed up against the concrete. When the nail is removed, spawling occurs on the side of the concrete which the nail is pressed against. In some instances contractors will use a specially designed nail that includes a section of the nail shank near the end of the nail that protrudes outward. The outward protrusion provides frictional contact between the nail and the wall of the pilot hole and functions in much the same manner as the softer material described above. Such specially designed nails are extremely expensive when compared to standard nails, and also result in the same one-sided spawling discussed above.

As an alternative to nails, many contractors now use a screw anchor when a removable anchor is desired. An example of a screw anchoring system is currently marketed by "Tapcon". This system includes a drill bit, a hex (or Phillips) driver and sleeve, and a screw. In operation a contractor will drill a pilot hole with a drill bit that is smaller than the diameter of the screw. The contractor then slides the sleeve over the drill bit so that the hex driver is powered by the drill. The contractor then uses the driver to drive the screw into the pilot hole. When it is desired to remove the screw the contractor reverses the driver. While this system does reduce spawling to the concrete surface when the screw can be reversed out of the pilot hole, some spawling often does still occur when the screw is reversed, and a number of other disadvantages exist. Screws are relatively expensive (approx. $0.18 each) when compared to the cost of standard nails (less than. $0.01 each). The wear on the contractor's drill is significant as it is used not only to drill the pilot hole, which necessitates very little torque, but also to drive and reverse the screw, which necessitates considerable torque. The time requirement of driving and reversing the screws is significant. In addition, the heads of the screws often strip out, making reversal of the screws impossible and resulting in substantial spawling to the concrete surface when the screw must be forcefully extracted from the concrete. Therefore, it would be beneficial to provide a low cost concrete anchoring system that can be removed without resulting in spawling to the surface of the concrete.

SUMMARY OF THE INVENTION

An object of the instant invention is to provide a system, apparatuses and methods for anchoring, particularly into materials that are relatively brittle under tension, such as concrete, stone, masonry and cementuous materials. Another object of the instant invention is to provide a system, apparatuses and methods for anchoring that are low cost. Another object of the instant invention is to provide a system, apparatuses and methods for anchoring, particularly into concrete and other "brittle" materials, which can be removed without causing spawling to the surface.

The objects of the instant invention are accomplished through the use of a two stage masonry drill bit. The drill bit includes two masonry cutting surfaces/stages having two different cutting diameters. The first cutting surface is located at the outer end of the drill bit and has a first diameter. The second cutting surface is located along the shank of the drill bit a distance away from the end and has a second diameter that is larger than the first diameter. In operation, the drill bit is inserted into a drill and the end of the bit is pressed against the surface of the material that is to be drilled (e.g. a concrete floor). The first cutting surface will cut a hole having a first diameter. As the bit cuts into the material the second cutting surface will advance and ultimately widen a portion of the hole to a second diameter. When the bit is removed, a hole is left in the material having two concentric diameters. A first, narrower diameter will extend into the material to a depth in which the end of the drill bit was driven. The second, larger diameter will extend from the surface down to a depth in which the second cutting surface was driven.

In a preferred embodiment of the instant invention, a depth gage is located on the shank of the drill bit a distance away from the second cutting surface in a direction opposite the first cutting surface. The depth gage can fixed or repositionable/adjustable. In one embodiment the depth gage is a member that protrudes from the shank of the drill bit to prevent the bit from advancing into the hole once the gage contacts the surface of the material that is being drilled.

The preferred embodiment of the anchoring system and methods of the instant invention utilize the two stage bit discussed above. In the method of the instant invention, the object that is to be anchored, such as a wooden form, reveal or the like, is placed on a concrete surface. A first hole is then drilled through the form and into the concrete to a first depth. A second hole of a diameter larger than the diameter of the first hole, and having the same center point as the first hole, is drilled to a second depth that is less than the first depth (although the terms first and second are used to describe the holes of the instant invention, it will be appreciated that the order of drilling the holes of the instant invention can be reversed without departing from the scope of the invention; however it is appreciated that by drilling the narrower hole first, the wider hole can be automatically centered). A standard nail is then driven through the hole in the form that is being anchored and into the hole in the concrete. The diameter of the first hole is slightly smaller than, equal to, or slightly larger than, the diameter of the nail shank so as to provide a desired frictional fit between the nail and the concrete. The diameter of the second hole is larger than the diameter of the nail shank, such that relief is provided between the surface of the nail shank and the circumference of the second hole at the concrete surface. The diameter of the second hole is less than the diameter of the head of the nail so as to prevent the nail head from being driven into the hole drilled in the form. The depth of the second hole can be varied to provide the desired amount of frictional force to the nail when located in the hole. Increasing the depth of the second hole increases the size of the relief, reducing the frictional force on the nail. Alternatively, decreasing the depth of the second hole decreases the size of the relief, increasing the frictional force on the nail. When the form is desired to be removed the nail is removed with a hammer or a crow bar. Because the shank of the nail never contacts the circumference of the second hole, which extends to the surface of the concrete, no spawling will occur. The holes can easily be filled with concrete patch. In some instances, the clean edges of the holes do not even need to be patched, as the clean edges do not result in an unattractive surface.

The instant invention results in a significant time savings over the anchoring systems of the prior art. In the instant invention, all that is required to install and anchor is the drilling of a two-stage pilot hole and driving a standard nail into the hole. This results in substantial time savings over prior art systems that require insertion of a separate softer material into the hole and over systems that require an anchor be screwed into the concrete. The removal, or tear down, or anchors of the instant invention, which requires only the use of a crow bar, provides significant time savings over removal of the screw anchors of the prior art, and eliminates spawling caused sometimes by screw anchors and almost always by nail anchor systems of the prior art. In addition to the significant time savings for both installation and tear down of the anchors, the instant invention also results in a substantial cost savings and convenience. The instant invention utilizes standard nails that are already purchased in bulk at low cost by most contractors. The contractors do not need to purchase any special tools, other than the inventive drill bit, to install and remove the anchors; instead the contractor merely uses a common hammer and/or crow bar. In addition, the life of the contractor's drill will be increased significantly as it is not being used for high torque driving and reversing of screws.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 2 is a front sectional view of an alternate embodiment of a two-stage drill bit of the instant invention.

FIG. 4 shows a front sectional view of an alternate embodiment of a nail anchoring a two-by-four form to a concrete surface through use of the method of the instant invention.

FIGS. 5a, 5b, 5c, 5c(i), 5c(ii), 5d, 5d(i) and 5d(ii) show various views of another alternative embodiment of a two-stage drill bit and corresponding cutters of the instant invention.

FIGS. 6a, 6b, 6c, 6c(i), 6c(ii), 6d and 6d(i) show various views of another alternative embodiment of a two-stage drill bit and corresponding cutters of the instant invention FIGS. 7a, 7b, 7c, 7c(i), 7c(ii), 7d, 7d(i) and 7d(ii) show various views of another alternative embodiment of a two-stage drill bit and corresponding cutters of the instant invention.

FIGS. 8a, 8b, 8b(i), 8c and 8c(i) show various views of another alternative embodiment of a two-stage drill bit and corresponding cutters of the instant invention.

DETAILED DESCRIPTION OF A PREFERRED EMBODIMENT

As required, a detailed embodiment of the present inventions is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
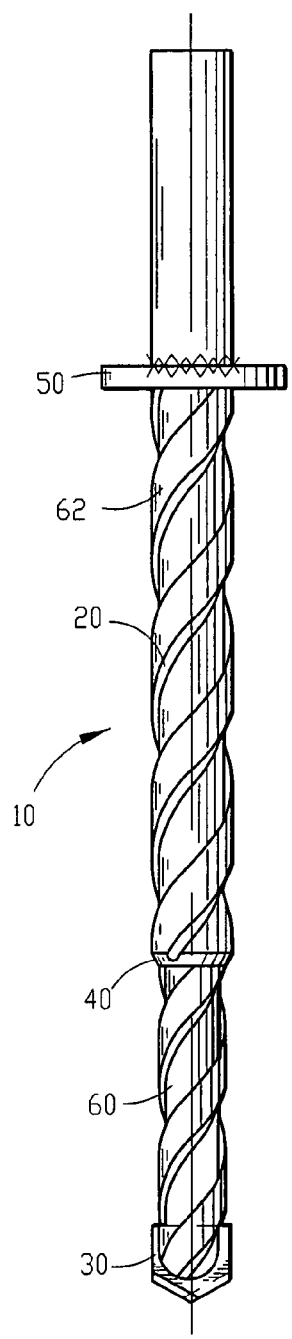
FIG. 1 is a front sectional view of an embodiment of a two-stage drill bit of the instant invention.

Referring to FIG. 1 a front sectional view of one embodiment of a two-stage drill bit of the instant invention is shown in which drill bit 10 includes shank/shaft 20, first stage cutter 30 on shaft 20, second stage cutter 40 on shaft 20 spaced apart from first stage cutter 30, and depth gage 50 on shaft 20 spaced apart from second stage cutter 40 in a direction opposite first stage cutter 30. As is shown in FIG. 1, first stage cutter 30 has a first cutting diameter that is less than the second cutting diameter of second stage cutter 40. In the embodiment of drill bit 10 shown in FIG. 1, shaft 20 increases in diameter at second stage cutter 40 such that flutes 62 have a larger diameter than flutes 60. FIG. 2 shows a front sectional view of an alternative embodiment of a two-stage drill bit of the instant invention in which shaft 20 of drill bit 10 has a single diameter over the entire length of drill bit 10. As is shown in FIG. 2, second stage cutter 40 protrudes from shaft 20, and flutes 60 and 62 have identical diameters.

Figure 3:
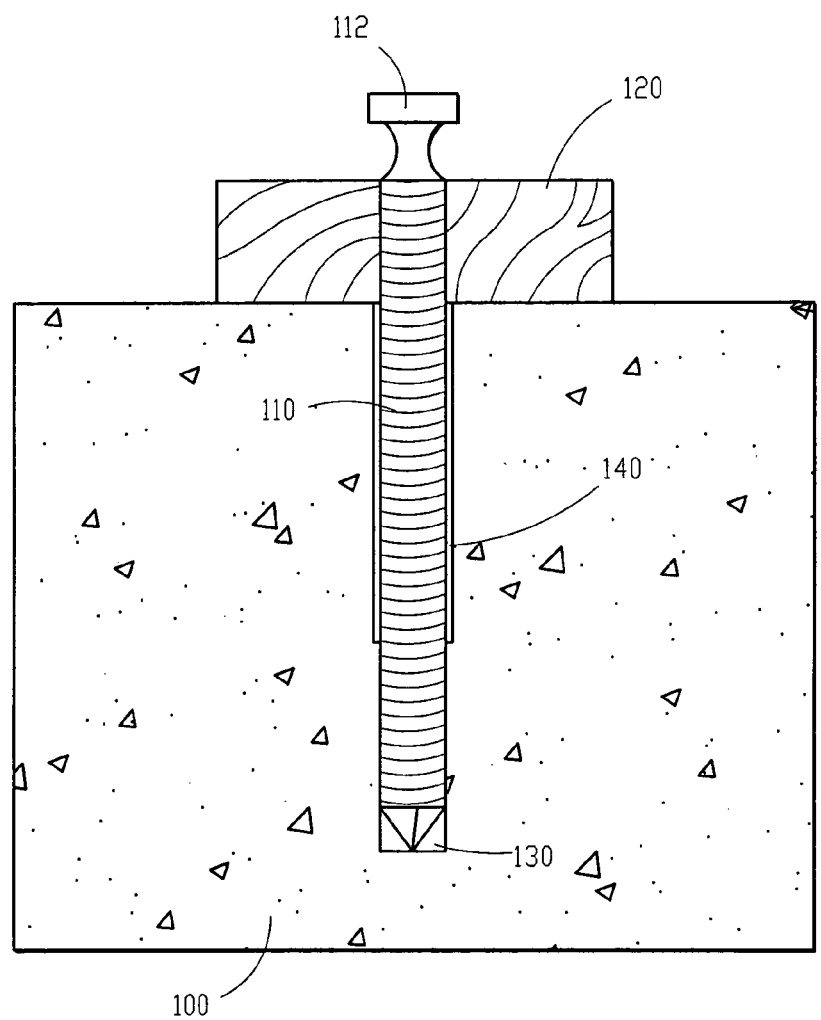
FIG. 3 is a front sectional view of a nail anchoring a two-by-four form to a concrete surface through use of the method of the instant invention.

FIGS. 3 and 4 show several front sectional views of a nail anchoring a two-by-four form to a concrete surface through use of the method of the instant invention. As is shown in FIGS. 3 and 4, first stage hole 130 is drilled in a material (such as a concrete slab 100) to a first depth. Second stage hole 140 is then drilled to a second depth which is less than the depth of the first stage hole. Second stage hole 140 is drilled concentric with first stage hole 130 such that nail 110 will not contact any of the material surrounding the circumference of second stage hole 140 when nail 110 is positioned in first stage hole 130. The diameter of first hole 130 is slightly smaller than the diameter of the shank of nail 110 so as to provide a desired frictional fit between the nail and the concrete. The diameter of the second hole 140 is larger than the diameter of the shank of nail 110, such that relief is provided between the surface of the nail shank and the circumference of the second hole at the concrete surface.

In FIG. 3 the diameter of second hole 140 is larger than the diameter of nail head 112 such that nail head could be driven into second hole 140 if no additional stop is provided. In the embodiment shown in FIG. 3, nail 110 is either driven through form 120 without cutting a pilot hole, or a pilot hole is drilled through form 120 with a different drill bit than that which is use to drill second hole 140. When the instant invention is used for anchoring objects such as wooden forms to a material, it is common to use multiple anchors on a single object. As such, it is cumbersome to first drill holes into the material to which the object is going to be mounted, and then drill a hole through the object to be mounted. Also, it is difficult to line up a nail on the surface of the object (i.e. a 2×4 form) and drive the nail through that object and into a hole on the opposite side of the object. Thus, it is preferred to drill a hole through the object and through the material to which the object is being anchored all at the same time. Therefore, as is shown in FIG. 4, in a preferred embodiment of the instant invention, the diameter of second hole 140 is less than the diameter of head 112 of nail 110 so as to prevent the nail head from being driven into a hole drilled in the form at the same time as drilling second and/or first holes 130 and 140.

The depth of second hole 140 in FIGS. 3 and 4 can be varied to provide the desired amount of frictional force to the surface of nail 110 when located in first hole 130. Increasing the depth of second hole 140 increases the size of the relief, reducing the length of nail 110 that can be driven into first hole 130 and thus decreasing the frictional force on the surface of nail 110. Alternatively, decreasing the depth of second hole 140 decreases the size of the relief, increasing the length of nail 110 that can be driven into first hole 130 and thus increasing the frictional force on the surface of nail 110.

In the instant invention, when form 120 is desired to be removed nail 110 is removed with a hammer or a crow bar. Because the shank of nail 110 never contacts the circumference of second hole 140, which extends to the surface of concrete 100, no spawling will occur. The holes can easily be filled with concrete patch. In some instances, the clean edges of the holes do not even need to be patched, as the clean edges do not result in an unattractive surface.

The depth of first stage hole 130 is sufficient to at least allow the tip of nail 110 to be driven through two-by-four form 120 and through first stage hole 130 without bottoming out in concrete 100. The depth of second stage hole 140 is sufficient to allow nail 110 to be positioned in the hole and removed from the hole without resulting in spawling around the surface of the hole as the nail is removed, yet less than the length of the shaft of nail 110 so as to allow nail 110 to penetrate into first stage hole 130. The depth of second stage hole 140 in concrete 100 can be increased or decreased respectively to decrease or increase the frictional force between nail 110 and concrete 100.

It will be appreciated that the two-stage drill bit, 10, described above with respect to FIGS. 1 and 2, as well as those described below with respect to FIGS. 5-10, are ideal for use in the method of the instant invention. Nevertheless, it will be appreciated that multiple one-stage drill bits could be used without departing from the spirit or scope of the inventive method. Furthermore, it will be appreciated that the order of drilling the holes of the instant invention can be reversed without departing from the scope of the invention. Nevertheless, drilling the narrower, deeper hole first (first stage hole 130) provides the distinct advantage of automatically centering the wider, shallower hole (second stage hole 140).

In a preferred embodiment of two-stage drill bit 10 of the instant invention intended for use with a 16 duplex nail, first stage cutter 30 includes a cutting diameter of 0.156 inches to cut first stage hole 130 to a diameter 0.156 inches, and second stage cutter 40 includes a cutting diameter of 0.170 inches to cut second stage hole 140 to a diameter 0.170 inches. As the shank diameter of a 16 duplex nail is approximately 0.166 inches in diameter, nail 110 will be frictionally held in contact with concrete 100 at first stage hole 140 and will not contact concrete 100 at second stage hole 140. Shaft 20 of this embodiment has a length of approximately five inches. The length between the tip of first stage cutter 30 and second stage cutter 40 is approximately 1 and ⅜ inches, and the length between the tip of second stage cutter 40 and depth gage 50 is approximately 2 and ⅜ inches. This leaves approximately 1 and ¼ inches at the top of shaft 20 for a drill chuck to grasp the shaft without interfering with depth gage 50. In addition, the length between first stage cutter 30 and depth gage 50 provides a total cutting depth of 3 and ¾ inches, which allows an additional ¾ of clearance at the bottom of first stage hole 130 to allow a common nail, which will have a longer penetration length than a duplex nail (approximately 3 inch penetration depth from head to tip for 16 duplex), to be used without requiring any depth adjustment.

FIGS. 5-7 show various views of embodiments of a two-stage drill bit in which second stage cutter 40 is positioned within slot 22 that is machined through shaft 20 of drill bit 10. In each of FIGS. 5-7 like figure references (i.e. 5a, 6a, etc.) are intended to refer to corresponding views of each embodiment. FIGS. 5a, 6a, and 7a show front views of drill bit 10 looking at the surface of second stage cutter 40 and showing groove 24 for first stage cutter 30. FIGS. 5b, 6b, and 7b show front views of drill bit 10 rotated 90 degrees from the orientation of FIGS. 5a, 6a and 7a to show slot 22 for second stage cutter 40 and looking at the surface of first stage cutter 30. Slot 22 and groove 24 are both machined into drill bit shaft 20, and cutters 30 and 40 are positioned respectively in groove 24 and slot 22 and brazed or welded to shaft 20. In a preferred embodiment of the invention intended for use with a 16 duplex or 16 common nail, depth gage 50 is a ³⁄₆₄ inch thick washer having an outer diameter of ⅜ inch and an inner diameter of 0.135 inches that is brazed or welded to shaft 20 which has an outer diameter of 0.135 inches.

FIGS. 5c, 6c and 7c show the surface of an embodiment of cutter 30 of the instant invention, which is similar to cutters of prior art drill bits having a tapered cutting edge. FIGS. 5c(i), 6c(i) and 7c(i) show plan views of the tip of cutter 30 of FIGS. 5c, 6c and 7c. FIGS. 5c(ii), 6c(ii) and 7c(ii) show elevation views of the side of cutter 30 of FIGS. 5c, 6c and 7c. In a preferred embodiment cutter 30 has a height and width of 0.156 inches each. Cutter 30 tapers down from center tip 32 at an angle of 30 degrees and includes oppositely tapered cutting edges 34 and 36. FIGS. 5d, 6d and 7d show the surfaces of various embodiments of second stage cutters 40 of the instant invention. In FIG. 5d, cutter 40 includes two partially tapered edges or angled corners 42 and 44 which include oppositely tapered cutting faces 48 and 46 respectively (shown in FIGS. 5d(i) and 5d(ii)). In FIG. 6d, cutter 40 includes two partially tapered edges or angled corners 42 and 44 which include non-tapered cutting faces 48 and 46 respectively (shown in FIGS. 6d(i) and 6d(ii)). In FIG. 7d, cutter 40 includes two edges 42 and 44 tapering down from a center point in the same manner as described with cutter 30 of FIGS. 5 through 7.

FIGS. 8a, 8b, 8b(i), 8c and 8c(i) show various views of an embodiment of a two-stage drill bit of the instant invention in which second stage cutter 40 is attached as two wings to shaft 20 of drill bit 10, and in which no fluting is included on shaft 20. FIG. 8a shows a front elevation view of drill bit 10 showing the surfaces of cutters 30 and 40. FIGS. 8b and 8b(i) show top and front views of cutter 30 respectively. As is shown in FIGS. 8b and 8b(i) cutter 30 is generally triangular in shape and includes double tapering faces 32 and 34. Cutter 40 is made up of two separate wings that are brazed or welded to shaft 20. FIGS. 8c and 8c(i) show top and front views respectively of one of the wings of cutter 40. Each wing of cutter 40 includes a tapered front tip 41 and two tapered top faces 42 and 44.

Figure 10:
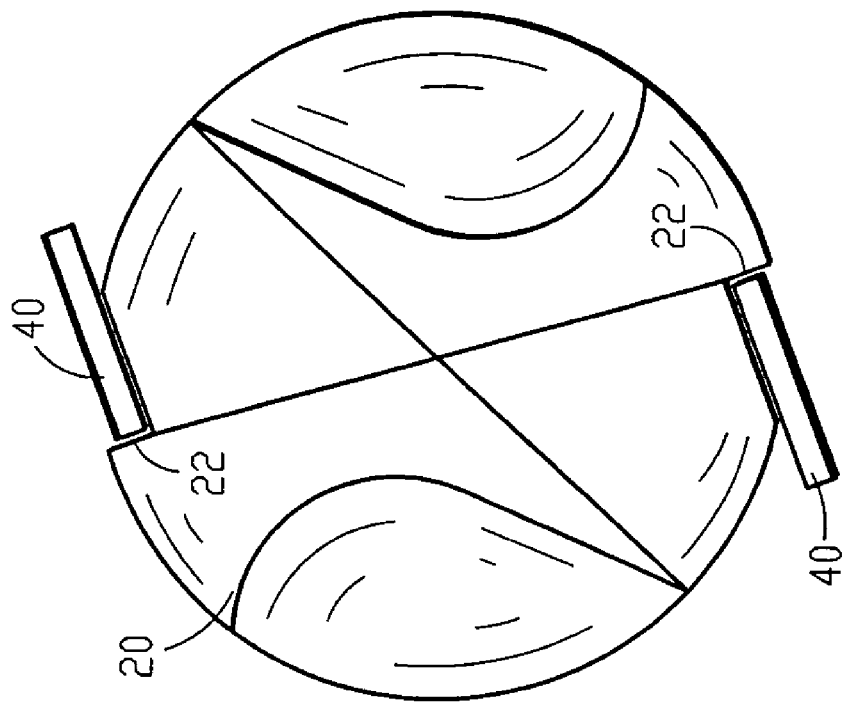
FIG. 10 shows a top sectional view of another embodiment of a second stage cutter for a two-stage drill bit of the instant invention.
Figure 9:
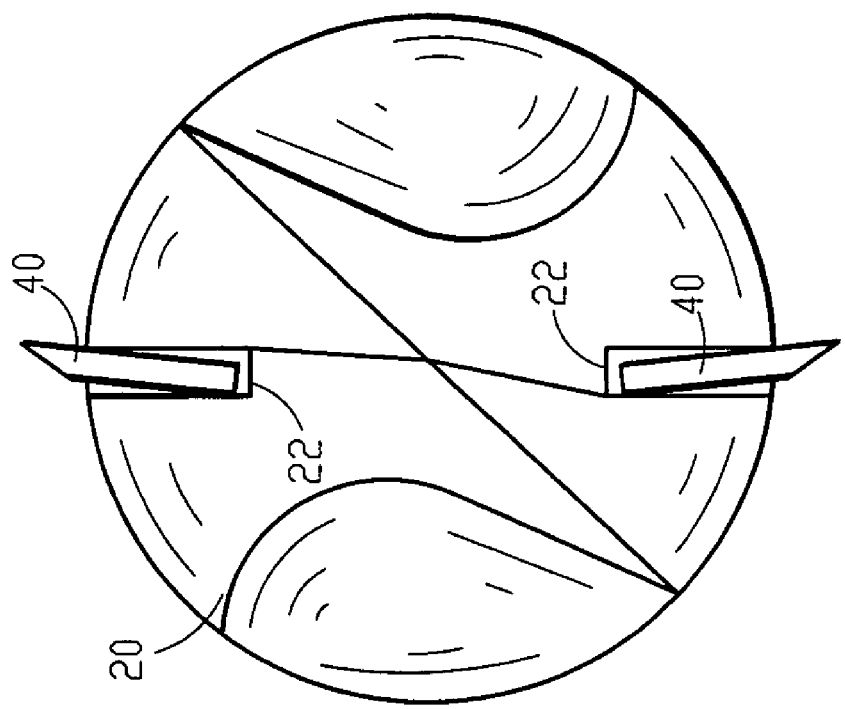
FIG. 9 shows a top sectional view of an embodiment of a second stage cutter for a two-stage drill bit of the instant invention.

FIG. 9 shows a top sectional view of an embodiment of second stage cutter 40 for a two-stage drill bit of the instant invention that includes two separate wings as described above with FIG. 8. As is shown in FIG. 9, each of the wings is positioned within a slot or groove 22 that is machined partway into shaft 20 so that the wings of cutter 40 each protrude generally radially from shaft 20. FIG. 10 shows an alternative embodiment in which each of the wings of cutter 40 protrude in a direction generally tangent to shaft 20. The embodiment shown in FIG. 10 requires less penetration of slot 22 into shaft 20, resulting in increased strength in shaft 20 over the embodiment shown in FIG. 9.

In the preferred embodiments of the inventive drill bit 10 shown in FIGS. 5-8, depth gage 50 is an annular ring or washer that is permanently brazed or welded to shaft 20. Nevertheless, alternative embodiments of depth gage 50 can be adjustably attached to shaft 20 to allow a single bit to be used for nails of a variety of lengths, or to allow the user to increase or decrease the depth of second stage hole 140 to achieve a desired frictional force or for a variety of materials in which friction levels may vary. In addition, an adjustable depth gage will allow a wider variety of objects, such as forms, reveal, etc. to be anchored by a single drill bit, as such various objects will come in a variety of thickness. In one embodiment, an adjustable depth gage is an annular ring that includes a set screw to hold the gage to the shaft of the drill bit. In alternative embodiments, the depth gage is a part of the holder for the drill bit, such as a drill chuck or an intermediate component between the chuck and the bit. In one such embodiment, the drill bit includes left handed male threads that thread into left handed female threads of the holder.

In a preferred embodiment of the instant invention the two stage drill bit is a masonry drill bit in which first stage cutter 30 and second stage cutter 40 are both designed for cutting materials such as concrete, stone, masonry and cementuous materials. The instant invention is ideal for use with such "brittle" (under tension) materials, which will normally spawl at their surface when prior art anchors are removed. Nevertheless, it will be appreciated that the drill bit of the instant invention, as well as the method of anchoring of the instant invention, can be used with any material in which anchoring is desired, and is therefore not limited to masonry drill bits and cutters. Furthermore, although the instant invention has been discussed in connection with anchoring to generally horizontal materials, it will be appreciated that anchoring to materials at any orientation, whether horizontal, vertical or otherwise, can be accomplished without departing from the spirit and scope of the invention. In addition, although the method of the preferred embodiment is discussed in connection with an anchor that is a nail having a generally continuous shank diameter, other anchors, such as screws, may be employed without departing from the scope of the invention.

It will be appreciated that any of the embodiments of drill bit 10 disclosed herein can utilize any combination of components from other embodiments. For example the embodiment of drill bit 10 and corresponding cutter arrangement disclosed in FIG. 8 of the instant invention could include fluting as disclosed in FIGS. 1-2 and 5-7. Furthermore, the specific type of fluting can be varied without departing from the instant invention. As further example, the cutting edge for second cutter 40 shown in any of FIGS. 5-7 can be used in connection with the wing-style second cutters 40 disclosed in FIGS. 8-10.

In a preferred embodiment, the drill bit shaft 20 of the instant invention is made of high speed steel, grade M2 or equivalent, and the cutters 30 and 40 are made of tungsten-carbide, grade M10 or equivalent and are bonded or brazed to shaft 20. Nevertheless, the drill bit/cutters of the instant invention can be made of any material and manufactured in any manner now known for drill bits or hereafter discovered, and can be percussion, non-percussion, diamond impregnated, or another other type of bit.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. An anchoring system including a drill bit for making a hole for an anchor and an anchor, the drill bit comprising:
    a first cutter including a first diameter sized to provide frictional contact between a generally fixed outer diameter of a shank of the anchor and a circumference of a hole made by said first cutter; and
    a second cutter spaced apart from said first cutter, said second cutter including a second diameter greater than said first diameter sized to provide a relief between the shank of the anchor and a circumference of a hole made by said second cutter, wherein said second diameter is generally less than a head diameter of the anchor, the head diameter of the anchor being greater than the shank diameter;
    a depth gage spaced apart from said second cutter opposite said first cutter; wherein a length between said depth gage and said first cutter is equal to or greater than a length of the anchor, wherein the length is approximately 3.75 inches and
    wherein a length between said depth gage and said second cutter is greater than a thickness of a material that is to be anchored to another material by the anchor and at least greater than one half said length between said depth gage and said first cutter, wherein the length is approximately 2.375 inches; and
    wherein the anchor comprises a 16 duplex or a 16 common nail including a shank diameter of approximately 0.166 inches, wherein said first diameter of said cutter is approximately 0.156 inches, and wherein said second diameter of said cutter is approximately 0.170 inches such that the frictional contact between the shank of the anchor and the circumference of the hole made by said first cutter is provided without any intermediate anchoring materials between the shank of the nail and the circumference of the hole.

2. The anchoring system as claimed in claim 1 wherein said first diameter is generally less than or equal to a shank diameter of the anchor and said second diameter is generally greater than the shank diameter of the anchor.

3. The anchoring system as claimed in claim 1 wherein said depth gage comprises an annular flange permanently connected to a shaft of the drill bit.

4. The anchoring system as claimed in claim 1 wherein said depth gage is incorporated into a holder for the drill bit that connects the drill bit to a drill.

5. The anchoring system as claimed in claim 1 wherein said depth gage is adjustably connected to a shaft of the drill bit.

6. The anchoring system as claimed in claim 1 wherein said length between said depth gage and said first cutter is greater than the length of the anchor.

7. The anchoring system as claimed in claim 1 wherein a length between said depth gage and said second cutter is less than a length of the anchor.

8. The anchoring system as claimed in claim 7 wherein said length between said depth gage and said second cutter is selected to provide a desired amount of frictional force to the anchor when located in the hole.

9. The anchoring system claimed in claim 1 wherein said second cutter comprises a tungsten-carbide material.

10. The anchoring system as claimed in claim 1 wherein said first diameter is sized to allow for non-rotational positioning of the anchor into and out of said hole made by said first cutter.

11. The anchoring system as claimed in claim 1 wherein said second cutter is positioned within a generally rectangular slot within a shaft of the drill bit.

12. The anchoring system as claimed in claim 11 wherein said second cutter includes two cutting edges, one each located on opposing sides of said shaft.

13. The anchoring system as claimed in claim 12 wherein said slot extends completely through said shaft and wherein said second cutter comprises a single piece of material.

14. The anchoring system claimed in claim 12 wherein said second cutter includes two separate wings.

15. The anchoring system claimed in claim 14 wherein said wings protrude from said slot in a direction generally radial to said shaft.

16. The anchoring system claimed in claim 14 wherein said wings protrude from said slot in a direction generally tangent to said shaft.

* * * * *